United States Patent
Winter et al.

(10) Patent No.: US 8,548,300 B2
(45) Date of Patent: Oct. 1, 2013

(54) METHOD AND DEVICE FOR RECORDING OF FRAMES

(75) Inventors: Marco Winter, Hannover (DE); Michael Drexler, Gehrden (DE)

(73) Assignee: Thomson Licensing, Issy-les-Moulineuax (FR)

(*) Notice: Subject to any disclaimer, the term of this patent is extended or adjusted under 35 U.S.C. 154(b) by 1021 days.

(21) Appl. No.: 12/291,766

(22) Filed: Nov. 13, 2008

(65) Prior Publication Data
US 2009/0142040 A1    Jun. 4, 2009

(30) Foreign Application Priority Data
Nov. 29, 2007    (EP) .................................... 07121847

(51) Int. Cl.
*H04N 5/76*    (2006.01)
(52) U.S. Cl.
USPC .......................................... 386/236; 386/267
(58) Field of Classification Search
USPC ........................ 386/200, 224, 343, 236, 267
See application file for complete search history.

(56) References Cited

U.S. PATENT DOCUMENTS

| 5,715,354 A * | 2/1998 | Iwamura et al. ............... 386/344 |
| 2001/0052057 A1 | 12/2001 | Lai et al. |
| 2006/0136649 A1 | 6/2006 | Park et al. |
| 2006/0155938 A1 | 7/2006 | Cummings et al. |

FOREIGN PATENT DOCUMENTS

| JP | 2007302284 | 11/2007 |
| KR | 100754226 | 9/2007 |
| WO | WO2006/065655 | 6/2006 |

OTHER PUBLICATIONS

Search report dated Jun. 3, 2008.

* cited by examiner

*Primary Examiner* — Huy T Nguyen
(74) *Attorney, Agent, or Firm* — Myers Wolin, LLC

(57) ABSTRACT

The invention is related to a method and a device for recording of frames.
Said method comprises buffering fractions of frames in a buffer and transferring from the buffer to memory devices data packets comprising at least one fraction, each, wherein after transferring to a first memory device a first fraction of a first frame, only fractions of said first frame are transferred to said first memory device until the amount of data belonging to said first frame and being transferred to said first memory device corresponds the storage capacity of at least one memory block comprised in said first memory device.

6 Claims, 5 Drawing Sheets

Fig. 1 – prior art

METHOD AND DEVICE FOR RECORDING OF FRAMES

This application claims the benefit, under 35 U.S.C. §119 of EP Patent Application 07121847.3 filed 29 Nov. 2007.

FIELD OF THE INVENTION

The invention is related to a method for recording of frames. The invention is further related to a corresponding device.

BACKGROUND OF THE INVENTION

Digital video cameras capture frames at a frame rate and with a frame resolution by help of an image capturing device being for instance a complementary metal-oxide semiconductor (CMOS) or a charge coupled device (CCD). The frame rate and the frame resolution result in a capture data rate.

For professional applications, frame rate and resolution need to be high. So, the capture data rate of professional video equipment is high as well.

Captured frames need to be stored. For storage in real-time, the storage data rate has to meet the capture data rate. But, commonly used slow memorizing devices like flash memories do have storage data rates which are significantly lower than said high capture data rate resulting in professional applications.

Therefore, a memory array comprising several flash memories is used. The flash memories in the memory array are provided with data in parallel. So, the storage data rate of the memory array equals the cumulated storage data rates of the flash memories comprised in said memory array. The ratio of the video camera's capture data rate to a single flash memory's storage rate gives the minimal number of flash memories which need to be comprised in the memory array for ensuring that the memory array's storage data rate meets the video camera's capture data rate.

For synchronizing purposes the flash memory array is connected to the video camera's image capturing device via a buffer, for instance a dynamic random access memory (DRAM).

A frame or part of a frame captured is transferred from the image capturing device to the buffer. Simultaneously to transferring a next captured part or frame, each flash memory in the flash memory array is provided with a portion of the buffered data. The size of said portion corresponds to the storage data rate of the flash memories.

Flash memories are organized in memory blocks. If some data in a given memory block shall be changed, even data remaining unchanged but being comprised in said given memory block needs to be re-written.

The fractions provided to a flash memory are much smaller than said memory blocks which results in storage of fractions of several frames in the same memory block.

So editing a frame after capturing requires erasing and rewriting all memory blocks comprising a fraction of said frame.

Disadvantageously, memory blocks allow only for a limited number of erasing/writing cycles which limits the life span of flash memories.

There is a need to elongate the life span of said flash memories arrays used in video sequence recording applications while maintaining a constant editing rate.

SUMMARY OF THE INVENTION

This achieved by a method and a device for recording of frames, said method comprising the features of claim 1 and said device comprising the features of claim 3.

Further embodiments of the inventive device comprise the features of one of the claims dependent on claim 3.

Said method comprises buffering fractions of the frames in a buffer and transferring from the buffer to memory devices data packets comprising at least one fraction, each, wherein after transferring to a first memory device a first fraction of a first frame, only fractions of said first frame are transferred to said first memory device until the amount of data belonging to said first frame and being transferred to said first memory device corresponds the storage capacity of at least one memory block comprised in said first memory device.

By transferring fractions of a frame to the same memory device to which a previously transferred fraction of said frame was transferred to, the method allows that each memory block is filled with data of a single frame, only. Thus, the number memory blocks comprising parts of a frame decreases. Consequently, the number of memory blocks, which need to be erased during an editing operation, decreases, also. This prolongs the life span of the set of memory devices.

In a further embodiment of the inventive method, fractions of the first frame not being transferred to said first memory device are transferred to at least a second memory device.

In even a further embodiment of the inventive method, the frames are comprised in a video frame sequence recorded in real-time and the step of buffering and the step of transferring are at least partly performed simultaneously.

In yet even a further embodiment of the inventive method, fractions which comprise data from a frame subset comprising said first frame are transferred to a subset of the memory devices said subset comprising at least said first memory device and said at least second memory device.

BRIEF DESCRIPTION OF THE DRAWINGS

Exemplary embodiments of the invention are illustrated in the drawings and are explained in more detail in the following description.

In the figures.

DETAILED DESCRIPTION OF THE INVENTION

Figure 1:
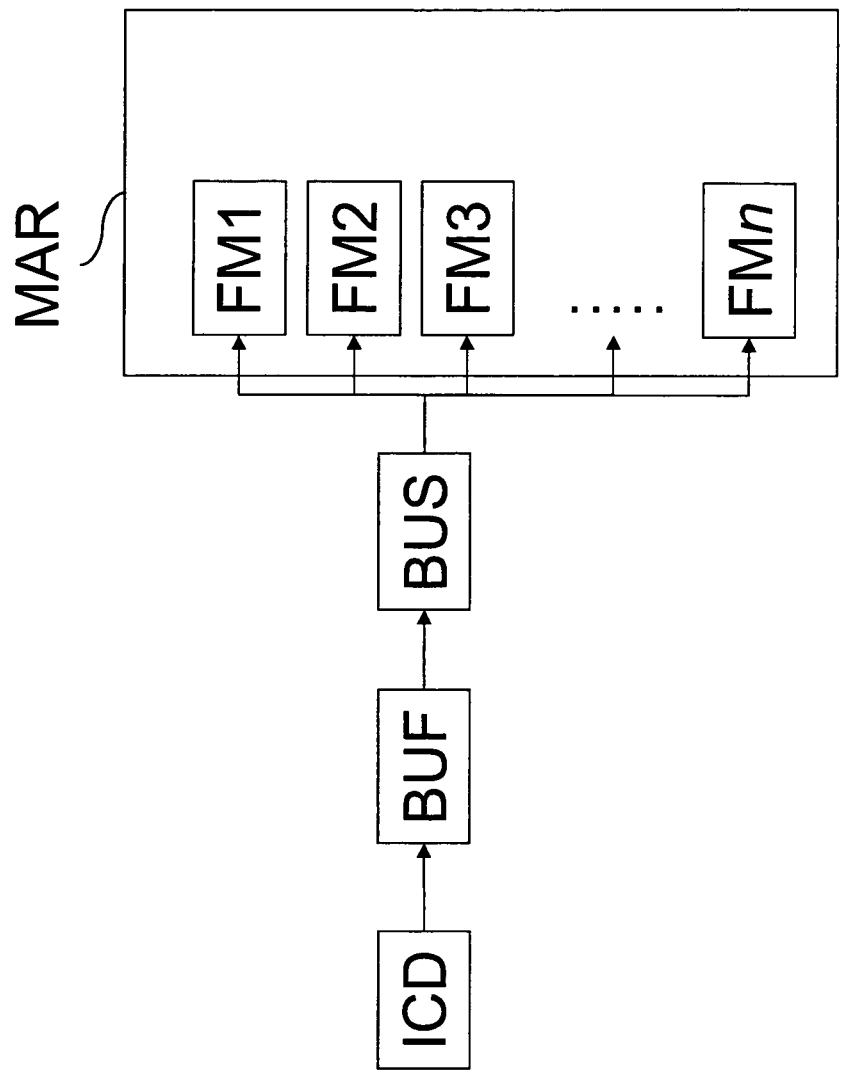
FIG. 1 depicts frame sequence storage as known from prior art.

FIG. 1 depicts the way frame sequences are stored according to the prior art. An image capturing device ICD like a CMOS-sensor or a CCD-sensor captures frames as bitmaps with a given frame rate. This results in a capturing data rate.

Captured images are forwarded to a buffer BUF, for example an SDRAM. A bus BUS transfers data from the buffer BUF to a memory array MAR. The memory array MAR comprises n flash memories FM1, FM2, FM3 . . . FMn.

The bus BUS operates at a bus rate determined by a clock cycle and is capable of carrying a data amount per clock cycle. This results in a bus data rate. The bus data rate equals or exceeds the capture data rate in order to avoid buffer overflow.

Each of the n flash memories FM1, FM2, FM3 . . . FMn operates at a flash storage data rate. The flash storage data rate is much lower than capture data rate. The number n of flash memories FM1, FM2, FM3 ... FMn in memory array MAR is chosen such that n is equal to or larger than the ratio of bus data rate to flash storage data rate. So, the storage data rate of the memory array MAR in its entirety is equal to or larger than the capture data rate. This enables real-time recording.

In each clock cycle, the bus BUS transfers a data packet from the buffer BUF to the memory array MAR. The data packet is partitioned into n slices of equal data amount. Each of the n flash memories FM1, FM2, FM3 ... FMn is provided with one of the slices. As the ratio of the data amount of one slice to clock cycle time is smaller than or equal to the flash storage rate, the n flash memories FM1, FM2, FM3 ... FMn are able to store the data packet before a next data packet is delivered by the bus BUS.

Figure 2:
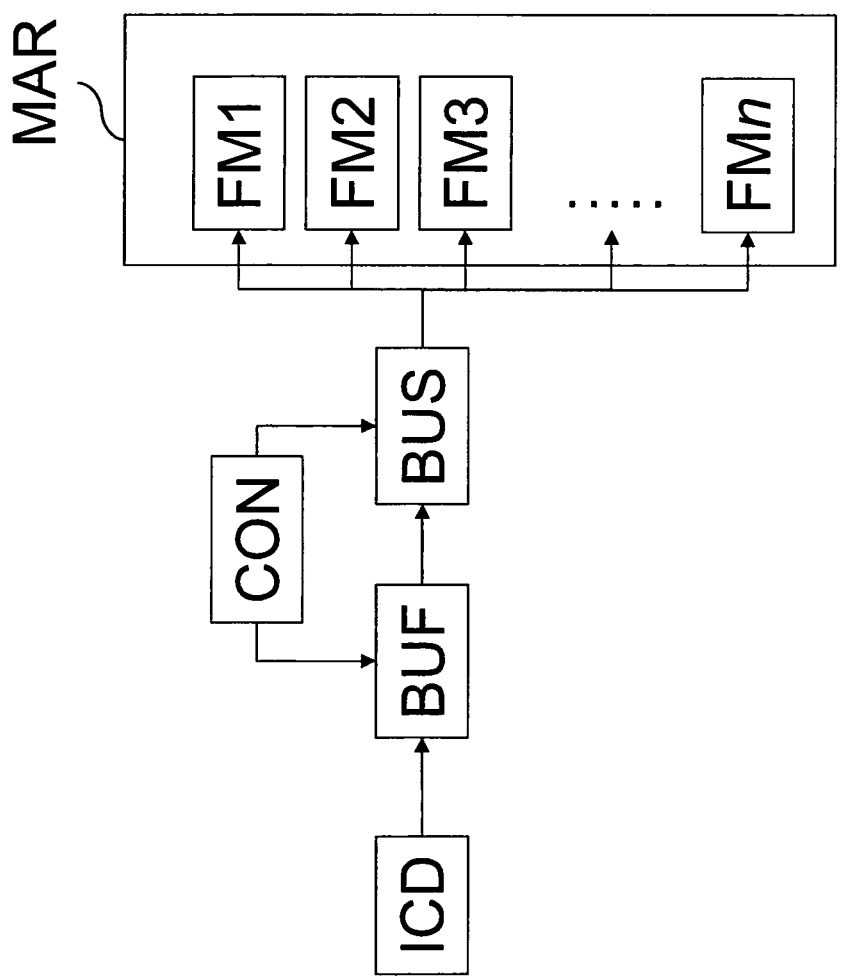
FIG. 2 depicts a first exemplary embodiment of the inventive frame sequence storage.

The first exemplary embodiment of the inventive storage principle depicted in FIG. 2 also comprises an image capturing device ICD, a buffer BUF, a memory array MAR comprising n flash memories FM1, FM2, FM3 ... FMn and a bus BUS which transfers data from the buffer BUF to the memory array MAR.

Furthermore, a controller CON is comprised. Said controller CON is enabled to control the content of the slices comprised in the data packets carried by the bus BUS.

In the beginning, the controller CON prevents data transfer from the buffer BUF to memory array MAR until the buffered data amount equals or exceeds the data amount n memory blocks can store. That is, the buffering capacity needs to be at least equivalent to the storage capacity of n memory blocks.

Then or already during accumulation of the data, the controller CON partitions the buffered data amount into n primary virtual memory blocks. Each of the primary virtual memory blocks comprises only data stemming from a single frame or, at most, from two adjacent frames. Subsequently, the controller CON forms a primary data packet for transfer wherein said primary data packet for transfer comprises n primary slices, one primary slice per primary virtual memory block. Finally, the controller CON causes the bus BUS to transfer said data packet such that each of the flash memories FM1, FM2, FM3 ... FMn is provided with one of the n primary slices. The size of each of the primary slices corresponds to the data amount that the corresponding flash memory FM1, FM2, FM3 ... FMn can process in one clock cycle.

In the next clock cycle, the controller CON forms a next data packet for transfer which again consists of n next slices, one next slice from each remainder of the primary virtual memory blocks, and causes the bus BUS to transfer the next data packet such that the next slice of the remainder of a given primary virtual memory block is transferred to the same flash memory FM1, FM2, FM3 ... FMn to which the primary slice of said given primary virtual memory block was transferred.

Simultaneously, the buffer space freed by transfer of the primary data packet is filled with newly captured frame data. This is buffering capacity efficient but requires complex control.

A buffer BUF is a sequence of buffer addresses each address being capable of carrying a certain data amount, for instance a byte. While the controller CON prevents transfer, the buffer addresses are filled with captured frame data sequentially and one of the primary virtual memory blocks corresponds to a sequence in address space.

So the controller CON forms the primary data packet from starting sub-sequences of said address sequences representing virtual memory blocks.

After transfer of the primary data packet, said sub-sequences are freed. That is, the freed addresses are not in sequence but separated. So newly captured frame data is scattered over the address space. In order to partition the newly captured frame data such that a set of next virtual memory blocks comprises only data of at most two adjacent frames the next virtual memory blocks cannot be formed as continuous address sequences but need to be sets of addresses being scattered over the buffer.

To avoid such complex control, the buffering capacity may be chosen larger such that it is equivalent to the storage capacity of 2*n memory blocks. Then, the second half of the buffer BUF is filled sequentially with newly captured frames while the first half is emptied by transfer to the memory array MAR. Then, one of the next virtual memory blocks corresponds to a sequence in address space of the second half.

In order to reduce the scattering of the data belonging to a single frame over the flash memories FM1, FM2, FM3 ... FMn, the controller CON may prevent transfer until at least n frames are buffered. Then, the controller CON forms a primary data packet for transfer wherein said primary data packet for transfer comprises n primary slices, one primary slice from each buffered frame. Finally, the controller CON causes the bus BUS to transfer said data packet such that each of the flash memories FM1, FM2, FM3 ... FMn is provided with one of the n primary slices.

In the next clock cycle, the controller CON forms a next data packet for transfer which again consists of n next slices, one next slice from each buffered frame remainder, and causes the bus BUS to transfer the next data packet such that the next slice of a remainder of a given buffered frame is transferred to the same flash memory FM1, FM2, F3 ... FMn to which the primary slice of said given buffered frame was transferred.

Then, data belonging to a single frame is stored in a single flash memory FM1, FM2, FM3 ... FMn. Only the very last frames, stored when the remaining storage capacity of each the flash memories FM1, FM2, FM3 ... FMn is insufficient for storing an entire frame, are stored in more than one flash memory FM1, FM2, FM3 ... FMn.

In order to reduce the latency prior to transfer, the primary data packet may be formed from data of the first frame buffered only. So, it may already be formed as soon as a sufficient data amount from the first frame is buffered. This primary packet is then transferred to the first flash memory FM1.

Since the primary data packet contains n-times as much data as the first flash memory FM1 can process in a single clock cycle, no data transfer to the first flash memory FM1 takes place for at least n−1 subsequent clock cycles.

Given, the data amount comprised in an entire frame corresponds to the storage capacity of l memory blocks, with l being smaller than n. So, during the next l−1 cycles in each clock cycle a data packet of data from said first frame may be transferred to one of the remaining flash memories not being occupied with processing a data packet.

If l is larger than or equal to n, transfer is paused at least for l−n cycles after transfer of the n-th data packet to the last remaining flash memory.

The two approaches, sending a data packet entirely to a single flash memory FM1, FM2, FM3 ... FMn and sending a slice of the data packet to each of the flash memories FM1, FM2, FM3 ... FMn, can be mixed. That is, only flash memories of a subset SET1, SET2 ... SETk are provided with slices of the data packet whereby the slices are larger and the number of slices in the data packet corresponds to the number of flash memories comprised in the subset SET1, SET2 ... SETk. Again, data packet provision to the subset SET1, SET2 ... SETk is paused for a number of cycles until the flash memories of said subset SET1, SET2 ... SETk processed the data packet. This will be explained in detail by help of FIG. 3.

Figure 3:
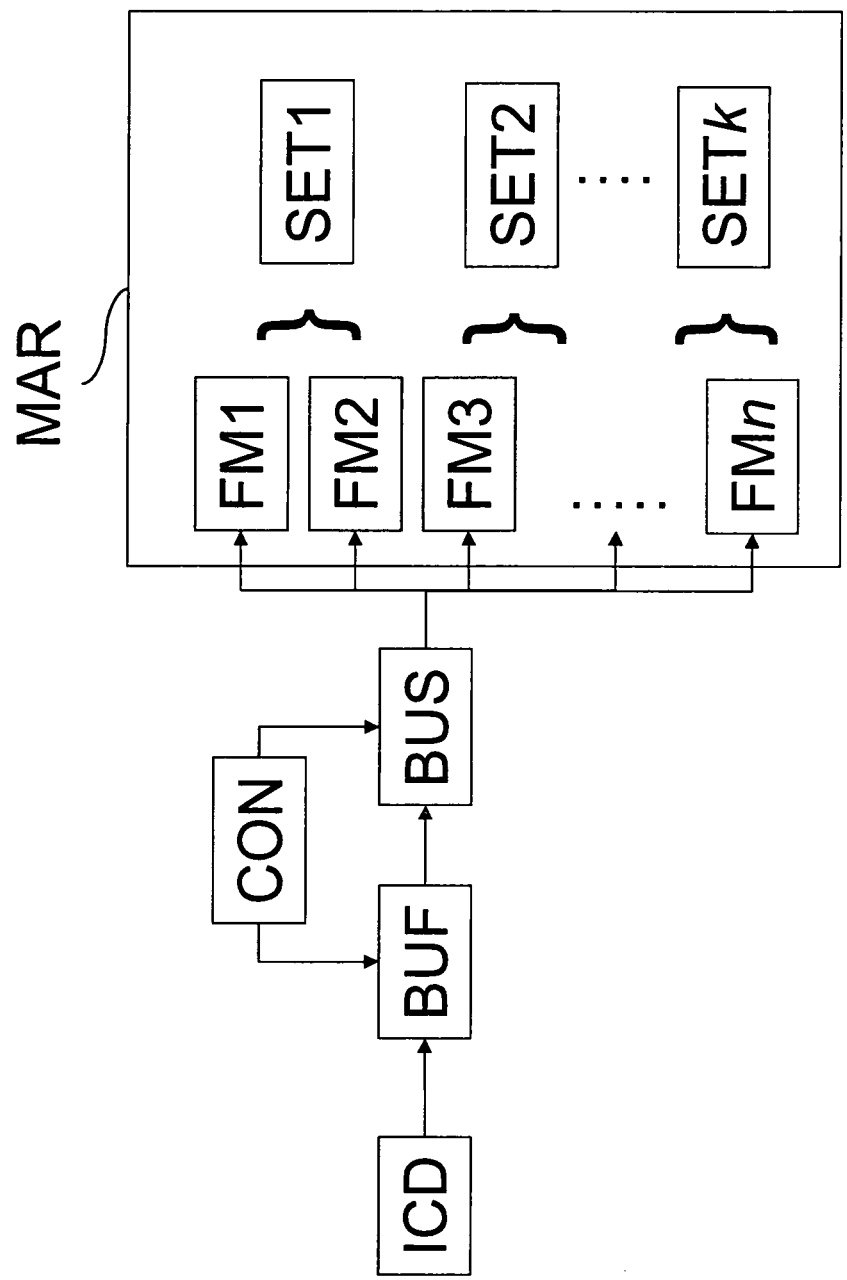
FIG. 3 depicts a second exemplary embodiment of the inventive frame sequence storage

The second exemplary embodiment of the inventive storage principle depicted in FIG. 3 also comprises an image capturing device ICD, a buffer BUF, a controller CON, a memory array MAR comprising n flash memories FM1, FM2, FM3 . . . FMn and a bus BUS which transfers data from the buffer BUF to a memory array MAR. And, the controller CON is enabled to control the bus BUS in dependency on the content of the buffer BUF.

But, the n flash memories FM1, FM2, FM3 . . . FMn depicted in FIG. 3 are grouped in k sets SET1, SET2 . . . SETk.

In the second exemplary embodiment depicted in FIG. 3, only one of the sets SET1, SET2 . . . SETk is provided with a data packet per clock cycle. As the data packet is larger than the amount of data the set to which it is provided can process in one clock cycle, no data packets are provided to said set for some clock cycles. The number of clock cycles during which no data packet provision takes place depends on the time the set needs for processing the previously provided data packet. Said processing time depends on the number of flash memories comprised in the set.

Furthermore, the controller CON controls the bus BUS in such a way that data packets belonging to the same frame sequence of one or more frames are stored in the same set SET1, SET2 . . . SETk.

And, as long not all data belonging to a given frame sequence is stored in the respective set SET1, SET2 . . . SETk, no data belonging to another frame sequence is provided to said respective set SET1, SET2 . . . SETk.

This requires the buffer BUF to be larger and increases the latency in the beginning but allows for storing a frame in one of the sets SET1, SET2 . . . SETk, only, and ensures that memory blocks of the flash memories comprise data of only one or just a few frames. So, if a frame or even a frame sequence is edited or discarded, only a few flash memories need to be accessed and only a few memory blocks need to be erased and, if necessary, re-written.

The number k of sets SET1, SET2 . . . SETk, the number of flash memories comprises in each of the sets SET1, SET2 . . . SETk and the number of frames in the frame sequence might be varied in dependency on the application's requirements regarding latency, buffer size and/or the acceptable degree of fragmentation of memory blocks.

Figure 4:
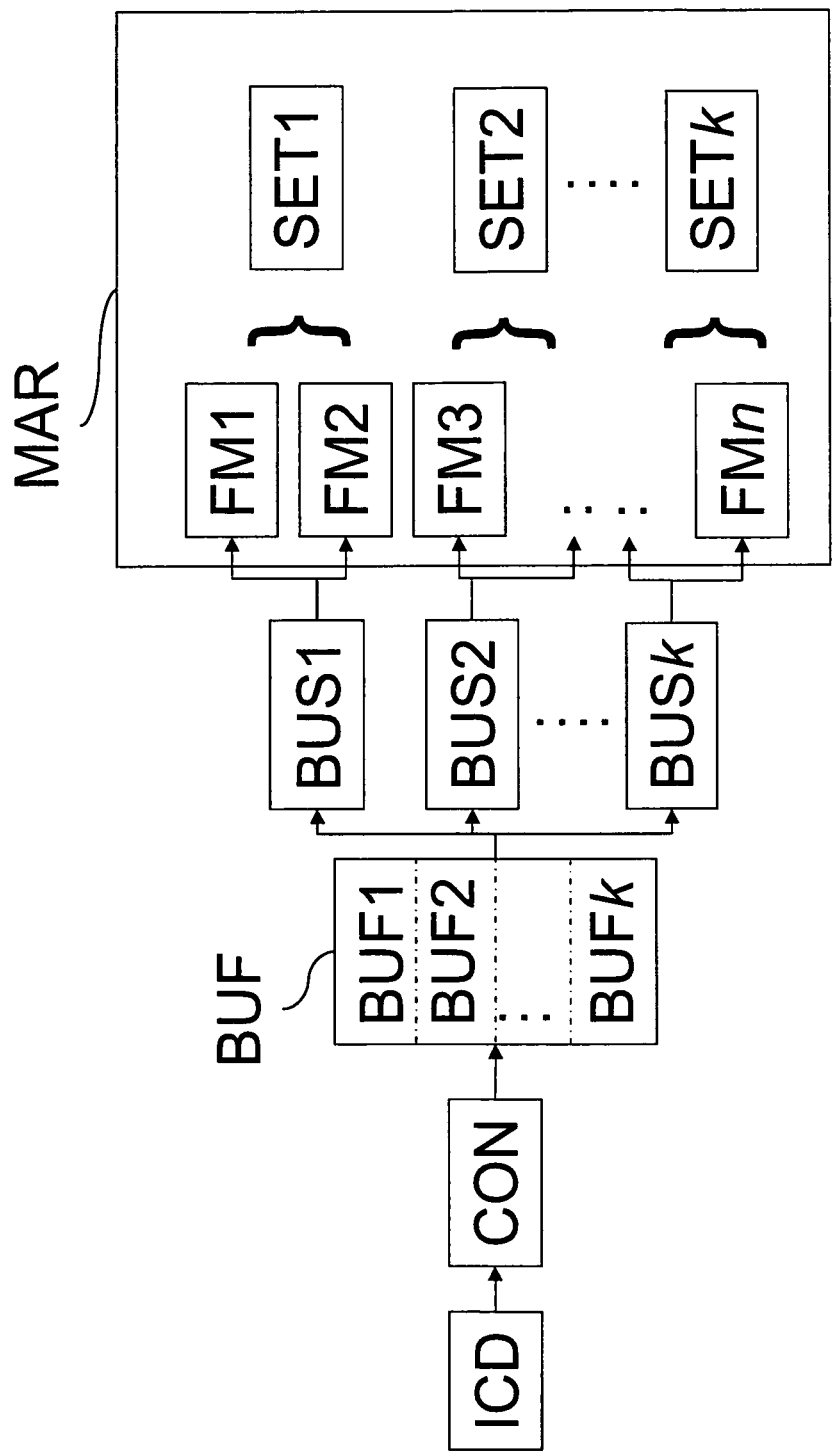
FIG. 4 depicts a third exemplary embodiment of the inventive frame sequence storage and FIG. 5 depicts a fourth exemplary embodiment of the inventive frame sequence storage.

FIG. 4 depicts a third exemplary embodiment of the inventive frame sequence storage principle. In this third exemplary embodiment, the buffer BUF comprises k buffering areas BUF1, BUF2 . . . BUFk. And, k buses BUS1, BUS2 . . . BUSk operate in parallel, each of the buses connecting one of the buffering areas BUF1, BUF2 . . . BUFk with one of the flash memory sets SET1, SET2 . . . SETk.

In FIG. 4 the controller CON is located between the capturing device ICD and the buffer BUF. The controller CON controls that image data belonging to a single frame sequence are stored in one of the buffering areas BUF1, BUF2 . . . BUFk, only.

Data comprised in one of the buffering areas BUF1, BUF2 . . . BUFk is transferred by the corresponding bus BUS1, BUS2 . . . BUSk to the corresponding flash memory device set SET1, SET2 . . . SETk. The bus data rates of each of the busses BUS1, BUS2 . . . BUSk corresponds to the storage data rate of the corresponding flash memory device set SET1, SET2 . . . SETk. And, the cumulated data rate of all the busses BUS1, BUS2 . . . BUSk equals the capture data rate.

The buffering areas BUF1, BUF2 . . . BUFk may be sections, i.e. address spaces, of a single physical intermediate storage device or several physically separated intermediate storage devices.

The controller CON switches between provision of captured image data to one of the BUF1, BUF2 . . . BUFk.

So, in the beginning buffering area BUF1 is filled. As soon as sufficient data for one data packet is comprised in buffering area BUF1 said data is transferred by bus BUS1 to set SET1. During said transfer further data is captured and filled in buffering area BUF1. As the capture data rate is higher than the bus data rate of bus BUS1, buffering area BUF1 becomes more and more filled. As controller CON detects that the remaining capacity of buffer BUF1 is not sufficient for storing the next frame it either switches to buffering said next frame in the buffering area BUF2. Or, a first part of said next frame is buffered in the buffering area BUF1 and the remaining part of the next frame is buffered in the buffering area BUF2. Similarly, as buffering area BUF2 is filled, the controller switches to buffering in a third buffering area. Finally, as buffering area BUFk becomes filled, the controller CON switches back to filling buffering area BUF1.

So, bus BUS1 can transfer the data in buffering area BUF1 to set SET1 while captured frames are stored in buffering areas BUF2 . . . BUFk and the buffering area BUF1 is empty when the controller CON switches back to filling buffering area BUF1.

One data packet transferred from buffering area BUF1 to set SET1 may be sliced and each of the flash memories in the set SET1 is provided with one slice per clock cycle. Then, the number of slices has to equal the number of flash memories in the set SET1.

Or, one data packet is transferred to one flash memory in the set SET1 and no data packets are transferred to said one flash memory in one or more subsequent clock cycles. The number of clock cycles depends on the number of flash memories comprises in set SET1.

As well, one data packet may be sliced and transferred to a subset of flash memories of the set SET1 and no data packets are transferred to said subset in one or more subsequent clock cycles. Then, the number of clock cycles depends on the number of flash memories comprises in set SET1 and on the number of flash memories comprises in subset. The number of slices has to equal the number of flash memories in the subset.

Transfer from buffering areas BUF2 . . . BUFk to sets SET2 . . . SETk by busses BUS2 . . . BUSk is analogue to the transfer described with respect to buffering area BUF1, bus BUS1 and set SET1.

Figure 5:
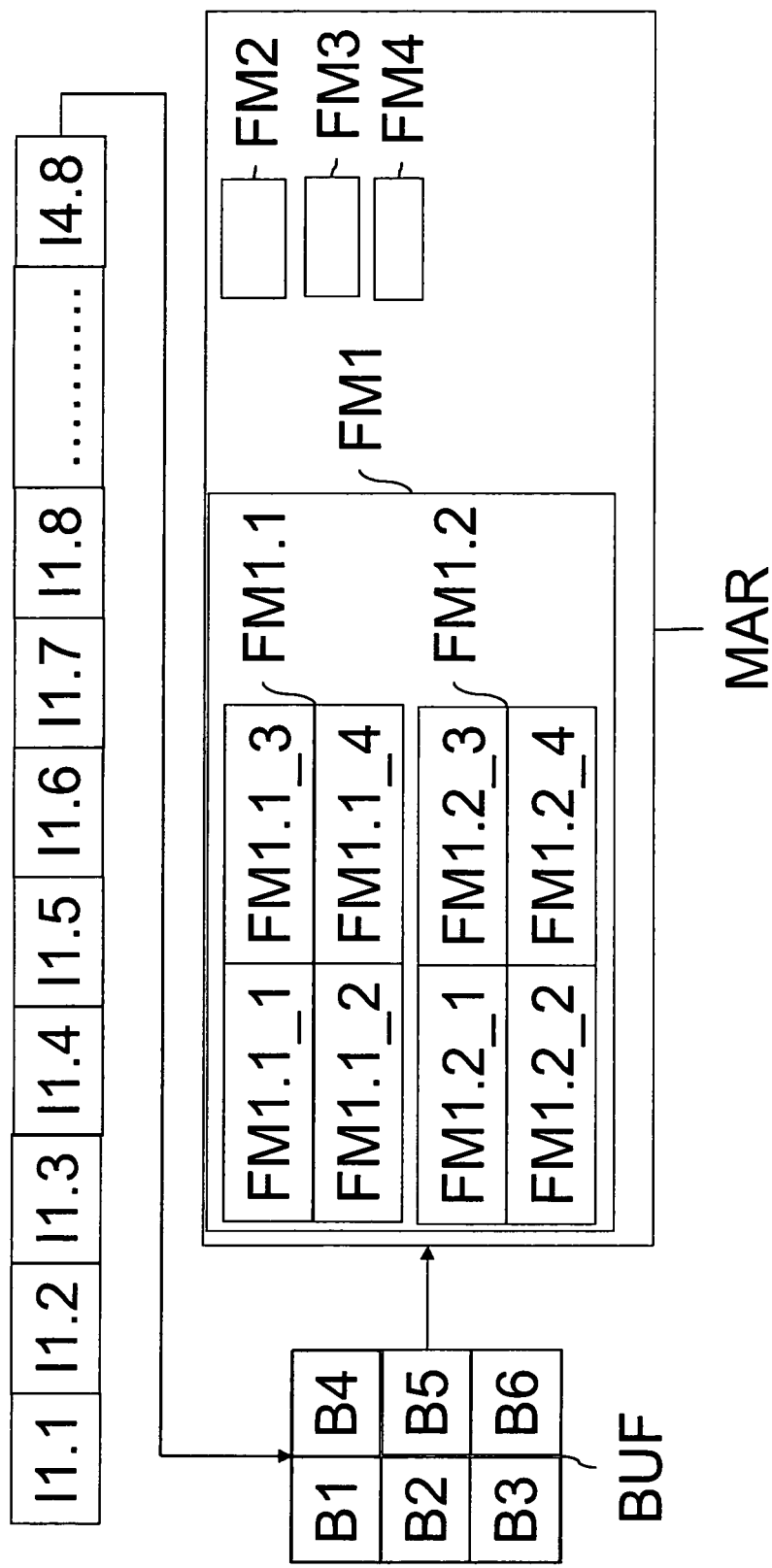

Given, as depicted in FIG. 5, an exemplary frame sequence of four frames I1 . . . I4 wherein each frame is provided in eight segments, for instance frame I1 is provided as I1.1 . . . I1.8 from the image capturing device ICD to the buffer BUF. In one clock cycle, one segment is provided from the image capturing device ICD to the buffer BUF. Within the given example, the amount of data comprised in one segment equals the amount a buffer address can store intermediately. And for instance, there are six buffer addresses B1 . . . B6 comprised in the buffer BUF.

On the other hand, exemplarily assume the memory array MAR comprises four flash memories FM1, FM2, FM3 and FM4 each comprising two memory blocks wherein each memory block comprises four memory addresses capable of storing as much content as can be stored at one buffer address. For instance flash memory FM1 comprises the memory blocks FM1-.1 and FM1-.2 wherein memory block FM1-.1 comprises four memory addresses FM1.-1÷_1, FM1-.1÷_2, FM1-.1÷_3, FM1-.1÷_4 and memory block FM1-.2 comprises four memory addresses FM1-.2÷_1, FM1-.2÷_2, FM1-.2÷_3 and FM1-.2÷_4. Each flash is accessible only every fourth clock cycle.

Each row of the table below corresponds to one clock cycle. Column BUF_IN indicates which frame segment is stored at which buffer address in the clock cycle. The buffer addresses B1 . . . B6 of the buffer BUF and their content at the end of the clock cycle as well as the flash memory block addresses FM1.1_1 . . . FM1.2_4 of flash memory FM1 and their content at the end of the clock cycle are indicated in the corresponding columns. For the sake of simplicity, only content of flash memory FM1 is comprised in the table. But, column BUF_OUT indicating the buffer address and the flash memory block address, between which transfer takes place in the clock cycle, not only indicates transfers to FM1 but also to FM2, FM3 and FM4 details of which are not included:

|  | BUF | | | | | | | FM1 | | | | | | | |
|---|---|---|---|---|---|---|---|---|---|---|---|---|---|---|---|
| Buf_In | B1 | B2 | B3 | B4 | B5 | B6 | Buf_Out | 1_1 | 1_2 | 1_3 | 1_4 | 2_1 | 2_2 | 2_3 | 2_4 |
| I1.1 > B1 | I1.1 | | | | | | | | | | | | | | |
| I1.2 > B2 | | I1.2 | | | | | B1 > FM1.1_1 | I1.1 | | | | | | | |
| I1.3 > B3 | | | I1.3 | | | | B2 > FM2.1_1 | I1.1 | | | | | | | |
| I1.4 > B4 | | | I1.3 | I1.4 | | | | I1.1 | | | | | | | |
| I1.5 > B5 | | | I1.3 | I1.4 | I1.5 | | | I1.1 | | | | | | | |
| I1.6 > B6 | | | | I1.4 | I1.5 | I.16 | B3 > FM1.1_2 | I1.1 | I1.3 | | | | | | |
| I1.7 > B1 | I1.7 | | | | I1.5 | I.16 | B4 > FM2.1_2 | I1.1 | I1.3 | | | | | | |
| I1.8 > B2 | I1.7 | I1.8 | | | I1.5 | I.16 | | I1.1 | I1.3 | | | | | | |
| I2.1 > B3 | I1.7 | I1.8 | I2.1 | | I1.5 | I.16 | | I1.1 | I1.3 | | | | | | |
| I2.2 > B4 | I1.7 | I1.8 | | I2.2 | I1.5 | I.16 | B3 > FM3.1_1 | I1.1 | I1.3 | | | | | | |
| I2.3 > B3 | I1.7 | I1.8 | I2.3 | | I1.5 | I.16 | B4 > FM4.1_1 | I1.1 | I1.3 | | | | | | |
| I2.4 > B4 | I1.7 | I1.8 | I2.3 | I2.4 | | I.16 | B5 > FM1.1_3 | I1.1 | I1.3 | I1.5 | | | | | |
| I2.5 > B5 | I1.7 | I1.8 | I2.3 | I2.4 | I2.5 | | B6 > FM2.1_3 | I1.1 | I1.3 | I1.5 | | | | | |
| I2.6 > B6 | I1.7 | I1.8 | | I2.4 | I2.5 | I2.6 | B3 > FM3.1_2 | I1.1 | I1.3 | I1.5 | | | | | |
| I2.7 > B3 | I1.7 | I1.8 | I2.7 | | I2.5 | I2.6 | B4 > FM4.1_2 | I1.1 | I1.3 | I1.5 | | | | | |
| I2.8 > B4 | | I1.8 | I2.7 | I2.8 | I2.5 | I2.6 | B1 > FM1.1_4 | I1.1 | I1.3 | I1.5 | I1.7 | | | | |
| I3.1 > B1 | I3.1 | | I2.7 | I2.8 | I2.5 | I2.6 | B2 > FM2.1_4 | I1.1 | I1.3 | I1.5 | I1.7 | | | | |
| I3.2 > B2 | I3.1 | I3.2 | | I2.8 | I2.5 | I2.6 | B3 > FM3.1_3 | I1.1 | I1.3 | I1.5 | I1.7 | | | | |
| I3.3 > B3 | I3.1 | I3.2 | I3.3 | | I2.5 | I2.6 | B4 > FM4.1_3 | I1.1 | I1.3 | I1.5 | I1.7 | | | | |
| I3.4 > B4 | | I3.2 | I3.3 | I3.4 | I2.5 | I2.6 | B1 > FM1.2_1 | I1.1 | I1.3 | I1.5 | I1.7 | I3.1 | | | |
| I3.5 > B1 | I3.5 | | I3.3 | I3.4 | I2.5 | I2.6 | B2 > FM2.2_1 | I1.1 | I1.3 | I1.5 | I1.7 | I3.1 | | | |
| I3.6 > B2 | I3.5 | I3.6 | I3.3 | I3.4 | | I2.6 | B5 > FM3.1_4 | I1.1 | I1.3 | I1.5 | I1.7 | I3.1 | | | |
| I3.7 > B5 | I3.5 | I3.6 | I3.3 | I3.4 | I3.7 | | B6 > FM4.1_4 | I1.1 | I1.3 | I1.5 | I1.7 | I3.1 | | | |
| I3.8 > B6 | | I3.6 | I3.3 | I3.4 | I3.7 | I3.8 | B1 > FM1.2_2 | I1.1 | I1.3 | I1.5 | I1.7 | I3.1 | I3.5 | | |
| I4.1 > B1 | I4.1 | | I3.3 | I3.4 | I3.7 | I3.8 | B2 > FM2.1_4 | I1.1 | I1.3 | I1.5 | I1.7 | I3.1 | I3.5 | | |
| I4.2 > B2 | | I4.2 | I3.3 | I3.4 | I3.7 | I3.8 | B1 > FM3.2_1 | I1.1 | I1.3 | I1.5 | I1.7 | I3.1 | I3.5 | | |
| I4.3 > B1 | I4.3 | | I3.3 | I3.4 | I3.7 | I3.8 | B2 > FM4.2_1 | I1.1 | I1.3 | I1.5 | I1.7 | I3.1 | I3.5 | | |
| I4.4 > B2 | I4.3 | I4.4 | | I3.4 | I3.7 | I3.8 | B3 > FM1.2_3 | I1.1 | I1.3 | I1.5 | I1.7 | I3.1 | I3.5 | I3.3 | |
| I4.5 > B3 | I4.3 | I4.4 | I4.5 | | I3.7 | I3.8 | B4 > FM2.2_3 | I1.1 | I1.3 | I1.5 | I1.7 | I3.1 | I3.5 | I3.3 | |
| I4.6 > B4 | | I4.4 | I4.5 | I4.6 | I3.7 | I3.8 | B1 > FM3.2_2 | I1.1 | I1.3 | I1.5 | I1.7 | I3.1 | I3.5 | I3.3 | |
| I4.7 > B1 | I4.7 | | I4.5 | I4.6 | I3.7 | I3.8 | B2 > FM4.2_2 | I1.1 | I1.3 | I1.5 | I1.7 | I3.1 | I3.5 | I3.3 | |
| I4.8 > B2 | I4.7 | I4.8 | I4.5 | I4.6 | | I3.8 | B5 > FM1.2_4 | I1.1 | I1.3 | I1.5 | I1.7 | I3.1 | I3.5 | I3.3 | I3.7 |
| | I4.7 | I4.8 | I4.5 | I4.6 | | | B6 > FM2.2_4 | I1.1 | I1.3 | I1.5 | I1.7 | I3.1 | I3.5 | I3.3 | I3.7 |
| | | I4.8 | I4.5 | I4.6 | | | B1 > FM3.2_3 | I1.1 | I1.3 | I1.5 | I1.7 | I3.1 | I3.5 | I3.3 | I3.7 |
| | | | I4.5 | I4.6 | | | B2 > FM4.2_3 | I1.1 | I1.3 | I1.5 | I1.7 | I3.1 | I3.5 | I3.3 | I3.7 |
| | | | I4.5 | I4.6 | | | | I1.1 | I1.3 | I1.5 | I1.7 | I3.1 | I3.5 | I3.3 | I3.7 |
| | | | I4.5 | I4.6 | | | | I1.1 | I1.3 | I1.5 | I1.7 | I3.1 | I3.5 | I3.3 | I3.7 |
| | | | | I4.6 | | | B3 > FM3.2_4 | I1.1 | I1.3 | I1.5 | I1.7 | I3.1 | I3.5 | I3.3 | I3.7 |
| | | | | | | | B4 > FM4.2_4 | I1.1 | I1.3 | I1.5 | I1.7 | I3.1 | I3.5 | I3.3 | I3.7 |

What is claimed is:

1. A method for recording of frames, said method comprising:
   buffering fractions of the frames in a buffer and
   transferring from the buffer to memory devices data packets comprising at least one fraction, each, wherein
   after transferring to a first memory device a first fraction of a first frame, wherein the first fraction corresponds to a storage rate of the first memory device, and only fractions of said first frame are transferred to said first memory device until the amount of data belonging to said first frame and being transferred to said first memory device corresponds to the storage capacity of at least one memory block comprised in said first memory device.

2. The method according to claim 1, wherein
   the frames are comprised in a video frame sequence recorded in real-time and the step of buffering and the step of transferring are at least partly performed simultaneously.

3. A device for recording of frames, said device comprising:
   a buffer for buffering frame fractions,
   a bus for transferring from the buffer to memory devices data packets comprising at least one fraction, each, and
   a controller being adapted to control transfer such that
   after transferring to a first memory device a first fraction of a frame belonging to a first subset of frames, wherein the first fraction corresponds to a storage rate of the first memory device, and only fractions of frames belonging to said first subset are transferred to said first memory device until the amount of data belonging to frames of said first subset and being transferred to said first memory device corresponds to the storage capacity of at least one memory block comprised in said first memory device.

4. The device according to claim 3, wherein
   the frames are comprised a video frame sequence recorded in real-time and the buffer is adapted to allow buffering and transfer in parallel.

5. The method according to claim 1, wherein fractions of said first frame not being transferred to said first memory device are transferred to at least a second memory device.

6. The method according to claim 5, wherein fractions which comprise data from a frame subset comprising said first frame are transferred to a subset of the memory devices said subset comprising at least said first memory device and said at least second memory device.

* * * * *